April 1, 1969      M. V. McKEON      3,436,094

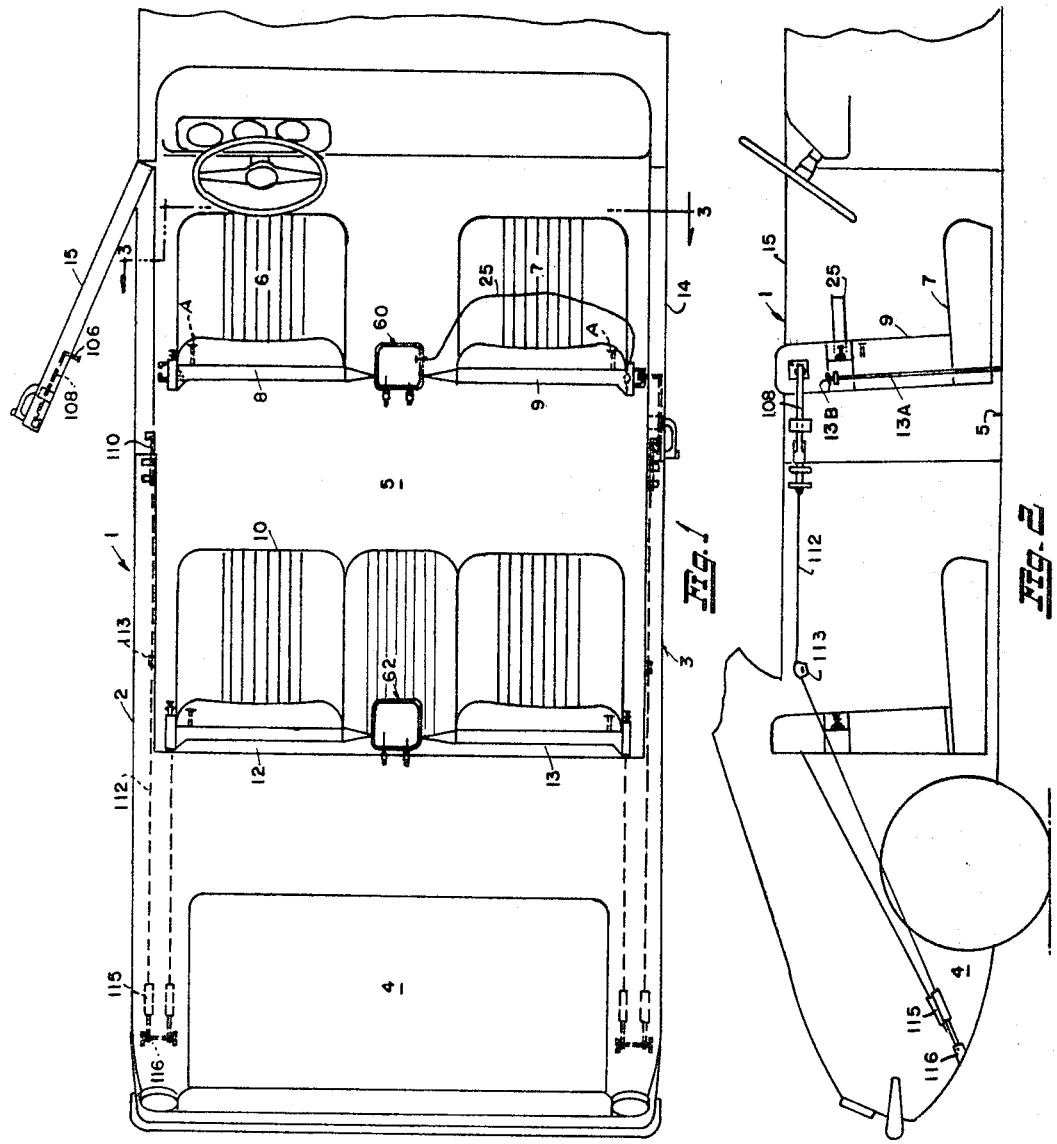

SAFETY HARNESS FOR OCCUPANTS OF POWER DRIVEN VEHICLES

Filed May 22, 1967

MICHAEL V. McKEON
INVENTOR.

BY *James L. Linnan*
ATT'Y

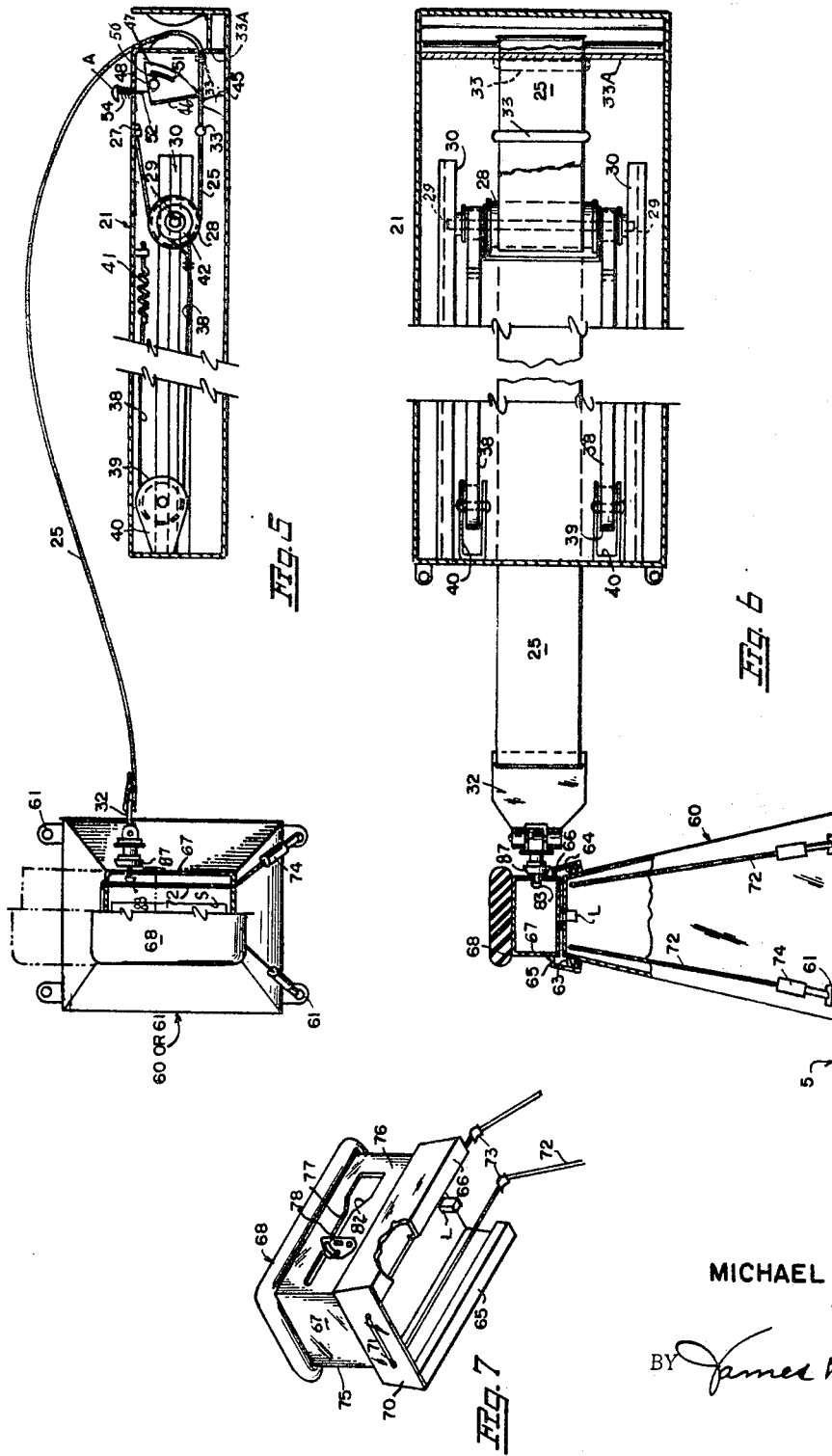

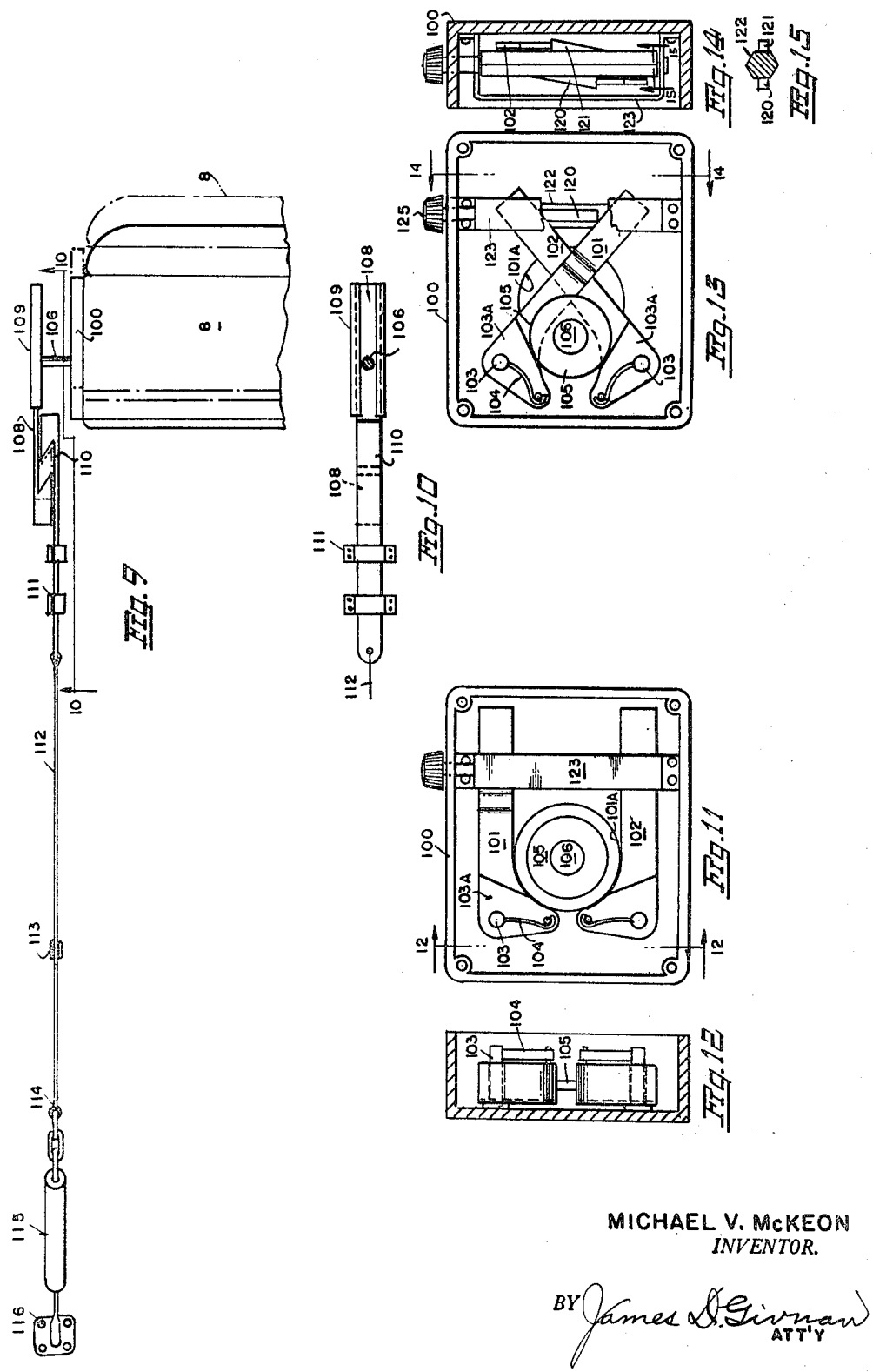

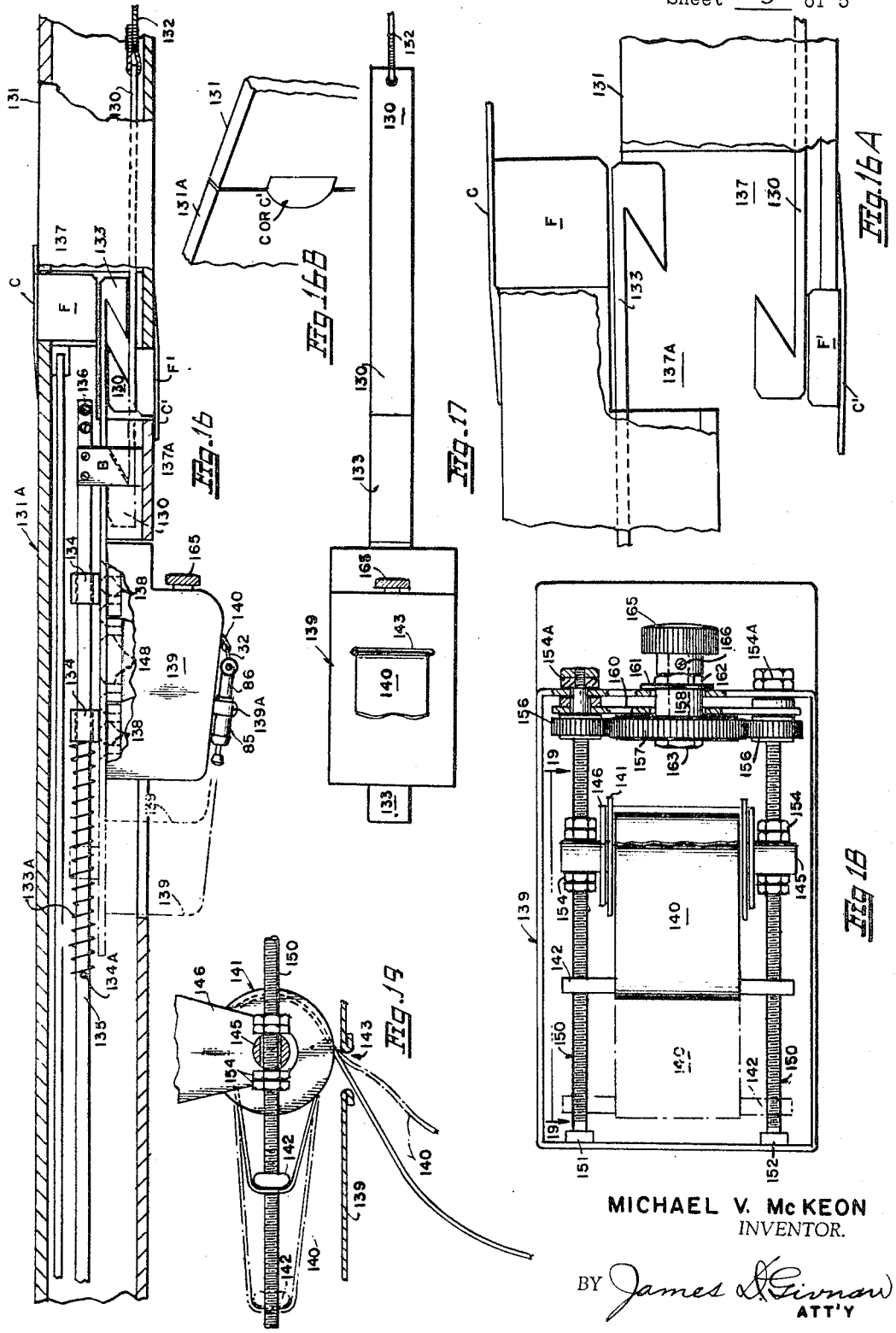

United States Patent Office 3,436,094
Patented Apr. 1, 1969

3,436,094
SAFETY HARNESS FOR OCCUPANTS OF POWER DRIVEN VEHICLES
Michael V. McKeon, 1940 Broadway NE.,
Salem, Oreg. 97303
Filed May 22, 1967, Ser. No. 639,982
Int. Cl. B60r 21/10
U.S. Cl. 280—150                     6 Claims

ABSTRACT OF THE DISCLOSURE

Safety harness incorporated in a power driven vehicle during the course of its construction and associated with each vehicle seat for transmitting the forces of an occupant's momentum, upon vehicle crash impact in any direction, against the harness for absorption by shock absorbers within the vehicle and utilization of such forces to prevent the vehicle doors from bursting open. The harness belt in contrast to the conventional two-piece lap strap is of one-piece construction with only one securable terminal end instead of two parts buckled or interconnected intermediate their ends. The effective length of the harness belt can be quickly, conveniently and accurately adjusted for the seat occupant by one hand motion without unfastening the belt, in contrast to conventional seat belts which require both hands for buckle manipulation, then the adjustment and finally reuniting the two free ends of the belt.

---

This invention relates to improvements in safety harness for seat occupants of power driven vehicles and has for its principal object to provide means actuated by the forces of an occupant's momentum, upon vehicle crash impact, against the harness for transmitting those forces to shock absorbing means and at the same time locking the vehicle doors against accidental opening.

The foregoing and other objects and advantages which will become subsequently apparent reside in the details of construction and operation as more fully hereinafter described and claimed, reference being had to the accompanying drawings forming a part thereof and in which:

FIGURE 1 is a fragmentary and somewhat diagrammatic top plan view of a vehicle body showing my invention operatively incorporated therein.

FIGURE 2 is a side elevational view, similarly diagrammatic, of FIGURE 1 with one side wall of the vehicle body removed to reveal internal parts.

FIGURE 5 is a composite view showing a top plan with a fragment broken away of a console securely mounted to the floor of the vehicle body centrally of the seats, as illustrated in FIGURES 1 and 3, and a fragmentary sectional plan view of a harness housing and harness-retracting means installed within the backrest of the vehicle seats, as shown in FIGURE 3.

FIGURE 6 is an elevational view of FIGURE 5 with some parts omitted for convenience of illustration.

FIGURE 7 is a perspective view of a typical shock-absorbing housing slidably mounted upon the top end of the console.

FIGURE 9 is a top plan view on an enlarged scale of one form of door and vehicle body interlocking mechanism actuated by the strain conducting means upon forward movement or flexing of the seat backs, one of which is shown fragmentarily.

FIGURE 10 is an elevational detail view taken along the line 10—10 of FIGURE 9.

FIGURE 11 is an elevational view of means in an open position for releasably securing the seat backs to the door and body interlocking means of FIGURE 9.

FIGURE 12 is a sectional view taken along the line 12—12 of FIGURE 11.

FIGURE 13 shows the locking means of FIGURE 11 in a closed, door-locking position.

FIGURE 14 is a sectional view taken along the line 14—14 of FIGURE 13.

FIGURE 15 is a sectional view taken along the line 15—15 of FIGURE 14.

FIGURE 16 is a fragmentary, longitudinal, sectional, plan view through a vehicle body and a door in closed position illustrating another form of interlocking means associated therewith and actuated by an occupant's forward momentum against a harness and transmitted through lockable harness-adjusting and retracting means carried by the door.

FIGURE 16A is an enlarged fragmentary, diagrammatic, detail view of certain of the door and body components of FIGURE 16 with the door partially open.

FIGURE 16B is a fragmentary, diagrammatic, perspective, detail view showing one of two typical shields each in the form of a plate secured respectively to the inside of the vehicle body wall and overlying in one direction a recess in the vehicle door, and to the outside of the door in an opposite direction overlying a recess in the body wall.

FIGURE 17 is an elevational detail view of the door and body interlocking means and harness-retracting and adjusting means removed from the assembly of FIGURE 16.

FIGURE 18 is an elevational view on an enlarged scale of the retractable and harness-adjusting means and its housing, and FIGURE 19 is a sectional plan view taken approximately along the line 19—19 of FIGURE 18.

Figure 3:
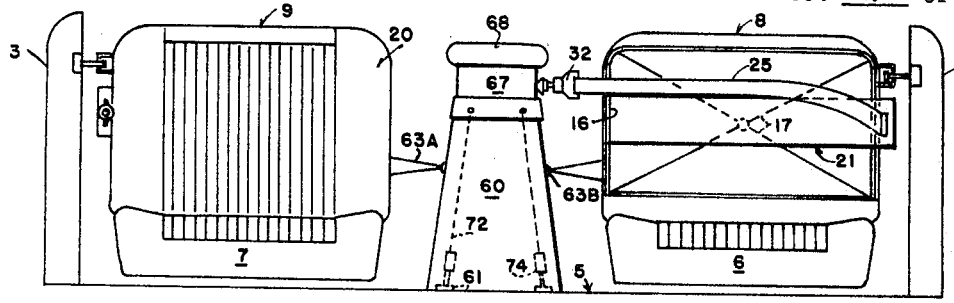
FIGURE 3 is an elevational view on an enlarged scale taken approximately along the line 3—3 of FIGURE 1.

With continuing reference to the drawings wherein like reference characters designate like parts and particularly FIGURES 1 and 2 thereof, reference numeral 1 indicates generally a passenger vehicle body having side walls 2 and 3, a rear trunk section 4, a floor 5, divided front seats 6 and 7 provided with seat backs or backrests 8 and 9, respectively, and rear seats 10 provided with seat backs 12–13.

The showing of passenger car body as such and equipped with only two front doors 14 and 15 does not necessarily prescribe any limits of utility since, as will be subsequently apparent, the invention may be readily adapted to the bodies of a wide range of passanger-carrying vehicles regardless of seating capacity or the number of front and rear doors associated therewith.

Since, as best illustrated in FIGURE 3, the front seats and their respective seat backs 8–9 are identical except for their right and left disposition, a description of one will suffice for both. Each seat back comprising a frame structure indicated generally at 16, cross bracing as at 17 and suitably upholstered as at 20, in the usual manner, is provided (FIG. 2) with any suitable latching device such as a rod 13A manipulatable into and out of locking engagement with the vehicle floor 5 by a finger grip 13B at the top end of the rod.

An elongated shallow panel-like housing 21 (see also FIGS. 5 and 6) is mounted within the seat back and secured to the framework 16 in any suitable manner.

Figure 4:
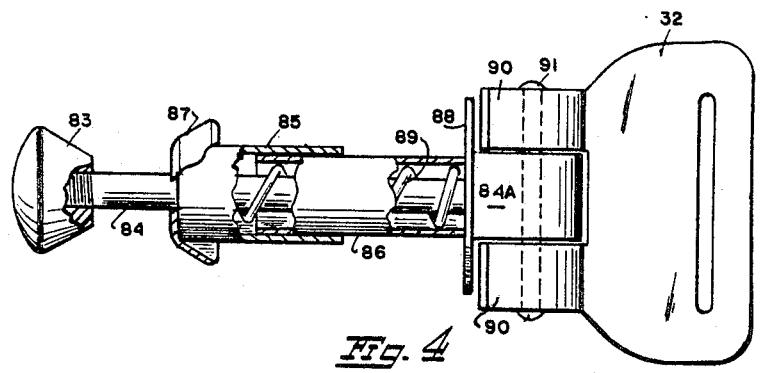
FIGURE 4 is an elevational view on an enlarged scale, with fragments broken away, showing a typical coupling for the terminal end of the harness belt.
Figure 8:
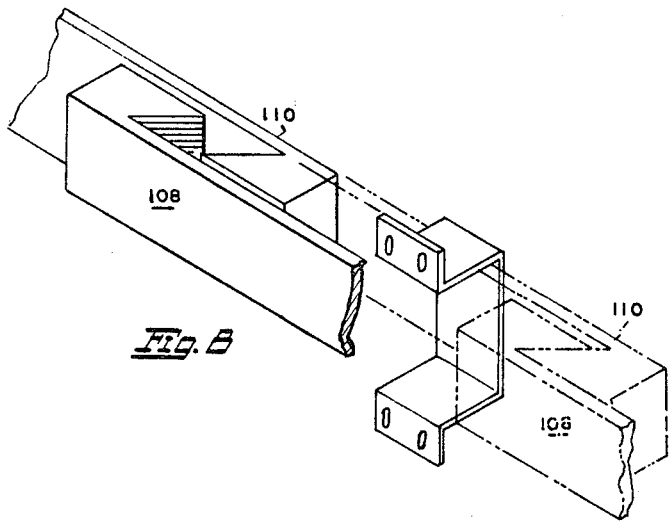
FIGURE 8 is a fragmentary perspective view on an enlarged scale of typical door and vehicle body interlocking means actuated by strain conducting means shown in FIGURE 9.

A harness including a belt 25 is secured at one of its ends as at 27 (FIG. 5) to the interior of housing 21. This end portion of the harness belt is entrained over a pulley 28 rotatably and slidably mounted by its shaft 29 lengthwise within a track 30 secured to one wall of the housing in any suitable manner. The belt 25 extends outwardly and forwardly from one end of housing 21 and across the front of the seat back as shown. The free end of the harness belt is provided with a fitting in the nature of a terminal hinge (see also FIG. 4) indicated generally at 32 whose function will be more fully hereinafter pointed out. Adjustably secured across the belt 25 is a belt-stop in the form of a lug 33 which has assumed, for example, the full line position shown in FIGURE 5 when the belt has been adjusted to the body of the seat occupant.

For maintaining constant tension on the harness belt 25 I provide a pair of flexible steel tapes 38 entrained over pulleys 39 rotatably mounted in a fixed position at the opposite end of the housing 21 by means of brackets 40 secured to the end wall thereof. The tapes 38 are yieldingly attached at one of their ends by means of tension springs 41 to one wall of the housing, their opposite ends attached as at 42 to a hub extending outwardly from both flanges of pulley 28. The reach of the harness belt 25 from the pulley 28 to the exterior of housing 21 extends through a slot in an inner end wall 33A. The span of the belt from pulley 28 to wall 33A passes between a fixed detent 45 secured to the bottom wall of the housing, and a cooperating movable detent in the form of a plate 46 pivotally mounted by its flange 47 and a pin 48 to an adjacent wall of the housing. The belt 25 is locked against retrograde movement from its extended reach by the cooperative belt-engaging positions of the detent 45 and plate 46 so that the terminal belt hinge 32 may be brought into operative engagement with the yieldable top portion of the console 60 as will be more fully hereinafter pointed out. A spring, not shown, urges plate 46 against detent 45.

Thus it will be seen that in the event of a crash or hard braking of the vehicle the forward momentum of the seat occupant against the reach of the belt 25 will be arrested by the abutment of the belt lug 33 against the inner end wall 33A of the housing 21. The extent of lug movement prior to abutting the wall is minimized to advantage by shortness of the distance between its full and dotted line positions shown.

For convenience in freeing the belt from detents 45–46 for retraction into housing 21 after release of the free end of the belt from the console 60, I provide the pin 48 with an arm 50 whose one end is slidable within an arcuate slot 51 in flange 47 to allow freedom of swinging movement of plate 46 during movement of lug 33 up to the wall 33A of housing 21. The opposite end of arm 50 is connected to the bottom end of a plunger 52 provided at its top end with a push button A and normally maintained in the elevated position shown by a compression spring 54. Rotation of arm 50 in a counterclockwise direction by downward movement of plunger 52 will cause engagement of the free end of arm 50 with the top end of slot 51 and thus swing plate 46 upwardly about the pivot pin 48 to free its bottom end out of engagement with the belt 25 to allow the belt to be automatically retracted to the interior of the housing 1 by the action of the tension spring 41 through the tapes 38.

The console as best illustrated in FIGURES 5–7 comprises a vertical housing 60 firmly secured as at 61 to the floor 5 of the vehicle body. An identical console 62 is also mounted between the rear seats 10–11 and since the construction and operation of both consoles are the same a description of one will suffice for both.

Two parallel rails 63–64 secured one each on opposite sides of the top of the console housing are slidably engaged by cooperating rail members 65–66 carried by a cap in the form of a hollow housing 67 to serve as an arm rest if desired and padded as at 68 for impact protection. The forward end of the rails 65–66 is bridged by a cross member 70 apertured as at 71 for the passage therethrough and across a cable 72 extending rearwardly and downwardly over fairleads 73 to shock absorbers 74 also anchored as at 61 to the flooring 5. To prevent the hollow cap housing 67 from being torn away from the top of the console housing by excessive forward thrust on either or both harness belts 25 attached to the housing as aforesaid, I provide a limit stop in the form of a lug L secured to the bottom wall of the cap housing at the rearward end thereof and extending downwardly through a slot S in the top wall of the console housing and extending substantially full length thereof.

The seat backs 6–7 and 12–13 as best shown in FIGURE 3 are reinforced against inward distortion by lateral braces 63A secured to the sides of the seat backs and bearing against the side walls of the console as at 63B.

Opposite side walls 75–76 of hollow housing 67 are slotted as at 77 and provided with a detent 78 normally held across the slot by a leaf spring. Each slot 77 is widened at one of its ends as at 82 for the insertion or removal, when necessary or desired, of the head 83 (FIGS. 4 and 6) of a stud 84 of the belt hinge assembly 32, on which stud is slidably mounted two telescopic tubular members 85–86 with a compression spring 89 therebetween and provided respectively with a cup washer 87 and a flat washer 88. The belt hinge 32 also includes two spaced apart circular end portions 90 hingedly attached by a pin 91 to the inner end 84A of member 84 to thereby provide a universal connection between this end of the harness belt and the slidably mounted hollow housing 67 on top of console 60.

The force of a seat occupant's forward momentum against the harness belt at a moment of crash impact is dissipated by transfer through the console cap 67 and cables 72 to the shock absorbers 74, and for utilizing that force for actuating the vehicle door locking means, I provide the outside of each front seat back with a housing 100 (FIGS. 9–15) having an opening 101A through the outside wall thereof and secured near the top end of the seat back as shown. Contained within the housing 100 are two gripping arms 101–102 pivotally attached as at 103, through their heads 103A to the outer wall of the housing and urged by leaf springs 104 into the open position shown in FIGURE 11. The arms extend forwardly in parallel relation when in an open position as shown in FIGURE 11, and overlap when in the closed position shown in FIGURES 13–14. Cooperating with the arms 101–102 is a flange 105 secured to the outer end of a stub shaft 106 (see also FIG. 9) whose outer end is secured to a hook member 108 slidable longitudinally within a trackway 109 secured to the car door (FIG. 1) in any suitable manner. Cooperating with hook member 108 is a companion hook member 110 slidable longitudinally within brackets 111 secured to or within the side wall of the vehicle in any suitable manner. The rearward end of hook member 110 is connected to the forward end of a cable 112, extending rearwardly over fairleads 113, whose opposite end is connected as at 114 to a shock absorbing unit 115 anchored as at 116 to the floor of the vehicle or to any other desired point of attachment.

From the foregoing it will be readily apparent that with the arms 101–102 reposing in the open position shown in FIGURE 11 the vehicle door carrying the hook 108 and its track 109 will be free to open and close by free passage of the stub flange 105 between the open hooks as shown and through the opening 101A. In the event of a crash or violent stop it will also be apparent that the seat back 8 will be pulled or deformed forward as indicated in broken lines by the forward thrust load of a seat occupant against the harness belt and that such movement also imparted to the housing 100 and its related parts will cause the arms 101–102 to swing into their cruciform stub shaft gripping position of FIGURE 13 by the spreading cam action of the flange 105 between the heads 103A of the arms.

With particular reference to FIGURE 14, it will be seen that the arms will be held in the crossover gripping position by engagement of their rearward ends with the cam detents 120 and 121 carried by a shaft 122 journalled at its ends in a bracket 123 secured to the interior of the housing 100. Accordingly, the car door will be locked in a closed position until the forward ends of the arms are released from abutment with the cams 120–121 by rotating the shaft 122 a quarter turn through the medium of the finger grip 125 against a suitably placed spring (not shown).

It will be understood, of course, that the arms 101–102 are not actually subjected to direct impact of a crash force but are for the purpose, when in the crossed position in FIGURE 13, of preventing any side slippage or escape of the flange 105 and the stub shaft 106 from their positions over and against the edge of the opening 101A in the wall of the housing 100 so that the direct thrust will be transmitted to that wall.

With reference to the other form of the invention shown in FIGURES 16–19, one hook member 130 is slidably mounted lengthwise and suitably stabilized within the vehicle body 131 and normally extends a definite but small amount outwardly from the door frame and into the vehicle door 131A as shown. The opposite end of this hook member is connected by cable 132 to shock absorbing means (not shown) in the same manner as the hook member 110 in the first form. The companion hook member 133 is slidably mounted within the vehicle door 131A along a supporting rod in the form of a flat bar 135 secured at both of its ends as at 136 to convenient points of anchorage within the vehicle door.

A suitable limit stop (not shown) is provided for positioning each of the hooks 130 and 133, when inoperatively disposed, with sufficient clearance between their barbed ends to prevent accidental or unintentional interengagement of the hooks and resultant jamming of the car door against opening or closing.

To allow normal opening and closing of the vehicle door with the hook members disengaged and extended as shown in full lines (FIG. 16), I provide the edge of the door opening in the vehicle body with a recess 137 and the adjacent edge of the door with a recess 137A. Both recesses are provided respectively with fillers F and F' and shields in the form of plates C and C' overlying the recess and each having a projecting edge of curved formation as shown in FIGURE 16B to thus protect articles of clothing and the like from being snagged by projecting ends of the hooks when in their separated door-opening positions shown in full lines. When both hook members are interengaged as shown in broken lines they are reinforced and confined by a stabilizing bracket B secured to the interior of the vehicle door on both sides of the bar 135.

When the door is released from its locked position the hook members 130 and 133 are retracted to their normal full line positions by the rearward pull of the shock absorber to which the hook 130 is attached by cable 132 while hook 133 is retracted by the action of a compression spring 133A whose one end bears against the foremost sliding supporting bracket 134 for the belt housing 139, and whose opposite end bears against a pin 134A extending through the supporting bar 135.

Secured by means of fasteners 138 to the hook member 133 and slidable with it lengthwise on the bar 135 is the harness belt housing 139 within which are the belt retracting, adjusting and locking means best illustrated in FIGURES 18–19 wherein the harness seat belt 140, at the origin of its reach, is entrained about the harness belt retractor pulley 141 and extended forwardly therefrom over a cross bar 142 then rearwardly around the retractor pulley and then out from the housing through a transverse slot 143 in the outer wall thereof. The harness belt 140 is extended from housing 139 across the body of the seat occupant into engagement with the slide cap housing 67 of the central console 60 by engagement of the end of shaft 84 of the terminal end of belt hinge with the slot 77 in the cap.

The harness seat belt 140 is retained within the housing 139 when fully retracted by removable attachment of either of its tubular coupling components 85–86 to the outer wall of the housing by means of any suitable spring clip 139A.

Retractor pulley 141 is freely rotatable about a shaft 145 carried by a pair of brackets 146 secured to the hook member 133 by fasteners 148. The cross bar 142 functions as a traveller nut lengthwise on two parallel threaded shafts 150 journalled as at 151 and 152 in the end walls of the housing 139 and freely rotatable through the shaft 145, as best shown in FIGURE 19. Thus it will be seen that the brackets 146 and retractor pulley 141 operate in a fixed position relative to the hook member 133 by securement of the brackets and housing to the hook member by the fasteners 138 and 148 and further stabilized by lock nuts 154 carried by the threaded shafts 150 and bearing against opposite sides of the shaft 145.

The rearward ends of the shafts 150 are journalled through the end wall of housing 139, held in place by lock nuts 154A, and have secured thereto two driven gears 156 at all times enmeshed with and driven by a driving gear 157. The hub 158 of gear 157 extends through an assembly plate 160 through and slightly beyond the end wall of housing 139 to receive a washer 161 and a nut 162 threaded on the shaft of a bolt 163 to whose opposite end a turning knob 165 is secured as at 166.

From the foregoing it will be readily apparent that with the free end of the harness belt 140 secured to its point of attachment the available length of the belt can be extended or retracted as indicated by full and broken lines (FIG. 19) into conformity with the body of the wearer or position of the vehicle seat by advancing or retracting the cross member 142 upon rotation of the threaded shafts by means of the gear train 156–157.

The distance that the cross bar 142 is adjusted away from the retractor pulley 141 will affect the available length of the harness belt by double that distance, as indicated by FIGURE 19. The threaded shafts 150 are coarse threaded and the relative diameters between the driven gears 156 and the driving gear 157 by turning the knob 165 would further increase the speed of movement of the cross bar and thus rapidity of belt adjustment, even while the belt is fastened.

From the foregoing it will be apparent that I have provided safety harness for seat occupants of power driven vehicles wherein the adaptation, as shown in FIGURES 5–7, provides efficient, durable and positive means for quickly, for conveniently adjusting the harness belt to a seat occupant selectively at or near a desired chest-level, in contrast to conventional lap-straps and thereat, through the new and novel attaching means at both ends of the belt, gradually dissipate shock loads against the belt.

In the embodiment of the invention shown in FIGURES 1, 2, and 9–15, means are provided which serve a dual purpose of not only absorbing the shock loads against the harness belt, as aforesaid, but also utilizing those forces through new and novel means for locking the vehicle door to the vehicle body and finally dissipating the forces in shock absorbing means carried by the vehicle.

In the other embodiment of the invention illustrated in FIGURES 16–19, shock loads against the harness belt are transmitted directly from one end of the belt to one of the interengaging locking means and wherein the interior of the housing is provided with belt adjusting and locking means by quick and convenient manipulation from the exterior of the housing.

It is to be understood that although I have disclosed preferred embodiments of my harness belt system, certain components thereof are susceptible to changes in form, details of construction and functional disposition. Such variations could include the housing 67 (slidably mounted on the top of the console 60) being provided on its interior with a pair of the belt retracting and adjusting mechanisms (FIGS. 18–19) with the walls of the casing 139 being replaced by the walls 75–76 of housing 67. The belt retracting and adjusting means could be fixed in back-to-back attitude within housing 67 with just enough clearance for the widest part of the belt retractor pulleys 141 and the shafts 145 of each arranged in a vertical position. This would allow each belt for the driver and the front passenger to be pulled out in the requisite opposite directions separately. Housing 67 would, of course, continue to be slidable as heretofore described and there would be a catch or rest clip 139A or the like carried by housing 67 to hold the idle end 83 of each belt when fully retracted.

Another adaptation could involve securing both pairs of belt drum brackets 146 to the walls 75–76 of housing 67 instead of to the hook members 133 (FIG. 16) and both pairs of screw shafts 150 journalled in housing 67 instead of as at 151 and 154A in casing 139. If desired, brackets 146 could be dispensed with by journalling the drum shafts 145 in the walls of the housing 67.

The turning knob 165 for each pair of screw shafts 150 could be replaced by a small hand crank somewhat similar to a miniature window crank fitted to the side of housing 67 and operable within a saucer-like recess provided on the side walls thereof. The inner end of each crank shaft could also be replaced by a bevel gear or a worm gear so that operation of the cranks would rotate gears 156–157 more rapidly than rotation of the knobs by finger manipulation.

In general, the foregoing simply reverses the direction of movement of the belt terminals 83 which would travel from the central console slidable housing 67 over into engagement with hook members 133 in the vehicle doors. Belt retractor and adjusting housing 139 could be positioned with the gears 156–157 nearest to rear of the vehicle, as shown in FIGURE 18, which is preferable, or reversed with the gears nearest the front of the vehicle.

It is to be understood that wherever "crash impact" or "forward momentum" is mentioned herein, it is intended to cover any abrupt stoppage of the vehicle such as instant deceleration, quick braking or abrupt movement of the vehicle in any direction for any reason.

Having thus described my invention, what I claim is:

1. In a vehicle body having a floor, at least one passenger seat mounted upon said floor and including a seat back, the improvement comprising:
   harness belt-anchoring and yieldable attaching means in the form of a vertically disposed housing having the characteristics of a console and a cap slidably mounted on the top thereof,
   means interconnecting said cap to shock absorbing means secured to said floor of the vehicle rearwardly of said seat,
   a seat occupant's harness belt attached at one of its ends within a belt housing built into said seat back,
   harness belt-locking and adjusting means within said belt housing with one end of said belt extensible and retractable from one end of said belt housing,
   said belt entrained over a pulley within the belt housing,
   means rotatably supporting said pulley for movement lengthwise of the belt housing against the action of a tension spring therein,
   and manipulatory means operable from the exterior of said belt housing for locking the belt against retrograde movement from an adjusted extended position relative to the body of an occupant of said seat.

2. The improvement as claimed in claim 1, including shock absorbing means connected at one of their ends to the vehicle floor and at their opposite ends to said cap,
   said harness belt housing having a bottom wall, two end walls and two side walls with one of said end walls having a slotted opening therein,
   a belt pulley slidably and rotatably mounted for movement lengthwise within said housing,
   means urging asid pulley toward the end wall of the housing opposite that of said slotted end wall,
   one end of said harness belt secured to the interior of said housing, entrained over said pulley and extensible and retractable from the housing through said slotted end wall,
   detent means operable from the exterior of the housing for locking the belt in any of its said extended or retracted positions relative to said housing and to the body of a seat occupant,
   and said means for attaching the opposite or free end of said belt comprising a hinge attached to that end and including a shaft having means secured at its outer end engageable with the interior of said cap and means intermediate its ends resiliently urged against the exterior of the cap.

3. In a vehicle body having a floor, side walls with entrance openings therein and a door for each of said openings, at least two passenger seats mounted side-by-side upon the floor adjacent said doors and each seat including a seat back, the combination of,
   harness belt anchoring means secured to the vehicle floor between said seats and seat backs,
   harness belt attaching means yieldingly mounted upon said belt anchoring means,
   a first housing carried by each of said seat backs,
   a harness belt for each of said seats and seat backs,
   means adjustably locking one end of each harness belt to its respective said first housing,
   means attaching the opposite end of each belt to said yieldingly mounted belt attaching means,
   a second housing mounted on one side of each of said seat backs,
   a first hook member slidably carried by each of said doors,
   a second hook member slidably carried by each of said vehicle walls adjacent to and adapted for interengagement with said first hook members,
   shock absorbing means carried by the vehicle rearwardly of said seat backs,
   means interconnecting said second hook members with said shock absorbing means,
   means disposed within each of said second housings adapted to grip said first hook members upon forward movement of their respective seat backs,
   whereby seat occupants' momentum against said harness belts upon crash impact of the vehicle will be transmitted to and absorbed by said shock absorbing means.

4. The combination as claimed in claim 3 wherein each of said second housings has an outer wall with an opening therein,
   said first hook member including a stub shaft having a flange at its outer end normally adapted for free passage into and out of said housing through said wall opening,
   a pair of stub shaft gripping arms pivotally mounted at one of their ends within said housing normally in parallel relation to each other to permit opening and closing of said doors by passage of the stub shaft and its flange through said wall opening,
   a cam surface at the pivoted end of each of said arms in the path of movement of said flange,
   whereby pivotal movement of said gripping arms about their pivot points by the cam action of said stub shaft flange against each of said cam surfaces upon forward movement of its respective seat and said second housing will swing said arms into cruciform relation to each other about said stub shaft to hold said flange against said wall of the housing.

5. In a vehicle body having a floor, side walls with at least one entrance opening therein and a door therefor, at least one passenger seat mounted upon said floor adjacent said door and including a seat back, and harness belt anchoring means secured to the floor of the vehicle adjacent said seat and seat back, the improvement comprising, a first hook member slidably mounted within said door for movement lengthwise thereof, a second hook member slidably mounted within the adjacent body side wall engageable with said first hook member and connected to shock absorbing means carried within the vehicle body, a harness belt housing secured to and movable with said first hook member, a harness belt, means adjustably looking one end of said belt within said housing, means resiliently attaching the opposite end of said belt to said belt anchoring means whereby the force of a seat occupant's forward momentum against the belt at a moment of vehicle crash impact will through the resultant interconnection of said hook members be transmitted to and dissipated by said shock absorbing means.

6. The improvement as claimed in claim 5 wherein said harness belt housing includes an inner wall, side and end walls, and an outer wall having a slotted opening therein, said belt adjusting and locking means comprising a pair of threaded parallel shafts journalled at both of their ends in said end walls of said housing, a gear train interconnecting said shafts and operable from the exterior of the housing to impart rotation to both of said shafts in the same direction, means secured to said first hook member and rotatably supporting said belt pulley on the interior of the housing in a fixed position relative to said shafts, a cross bar threadedly engaged with said shafts and movable therealong toward and away from said belt pulley upon rotation of said shafts, said harness belt entrained about said belt pulley and said cross arm and extensible and retractable from said belt housing relative to said belt anchoring means.

References Cited

UNITED STATES PATENTS

| | | | |
|---|---|---|---|
| 2,852,270 | 9/1958 | Hunt | 280—150 |
| 2,855,028 | 10/1958 | Matthews | 155—189 |
| 3,292,744 | 12/1966 | Replogle | 188—135 |
| 3,343,765 | 9/1967 | Baker | 242—107.4 |
| 3,343,874 | 9/1967 | Hildebrandt | 297—386 |

LEO FRIAGLIA, *Primary Examiner.*

JOEL E. SIEGEL, *Assistant Examiner.*

U.S. Cl. X.R.

180—82; 297—386